United States Patent [19]

Kato et al.

[11] Patent Number: 5,348,987
[45] Date of Patent: Sep. 20, 1994

[54] NOX REMOVAL CATALYST CONTAINING AN INORGANIC FIBER

[75] Inventors: Yasuyoshi Kato; Kunihiko Konishi, both of Kure, Japan

[73] Assignee: Babcock-Hitachi Kabushiki Kaisha, Japan

[21] Appl. No.: 3,446

[22] Filed: Jan. 12, 1993

[30] Foreign Application Priority Data

Jan. 21, 1992 [JP] Japan .................. 4-008649

[51] Int. Cl.$^5$ ............................................. B01J 21/08
[52] U.S. Cl. .................................. 502/242; 502/247; 502/254; 502/255; 502/527
[58] Field of Search ............... 502/242, 247, 254, 255, 502/527

[56] References Cited

U.S. PATENT DOCUMENTS

| | | | |
|---|---|---|---|
| 4,681,658 | 7/1987 | Hsu et al. ........................ | 162/156 |
| 4,774,217 | 9/1988 | Takeuchi et al. . | |
| 5,155,083 | 10/1992 | Yoshida et al. ..................... | 502/242 |

FOREIGN PATENT DOCUMENTS

| | | |
|---|---|---|
| A0398752 | 11/1990 | European Pat. Off. . |
| 2435967 | 11/1980 | France . |
| 50-128681 | 10/1975 | Japan . |
| 52-65191 | 5/1977 | Japan . |
| 52-122293 | 10/1977 | Japan . |

OTHER PUBLICATIONS

Patent Abstracts of Japan vol. 14, No. 275 (1990).

*Primary Examiner*—Patrick P. Garvin
*Assistant Examiner*—Brent M. Peebles
*Attorney, Agent, or Firm*—Lorusso & Loud

[57] ABSTRACT

NOx removal catalyst can be obtained by kneading various kinds of inorganic fibers and water containing a surfactant to make a pulp-like substance, adding a catalytic component thereto and then further kneading the resultant mixture to prepare a catalyst paste. The thus obtained catalyst paste is shaped into a honeycomb-like, plate-like or column-like form according conventional various molding methods, and then dried and calcined for use. Instead of the above catalytic components; catalytic carriers such as titanium, zeolite, zirconia and the like may be shaped and calcined in the same manner and used for carrying a catalytic component. A particularly high performance and strength can be obtained with good result when a composition produced by calcining a molybdenum (Mo), vanadium (V) or tungsten (W) compound born on titanium oxide at 400° to 700° C. is used.

4 Claims, 6 Drawing Sheets

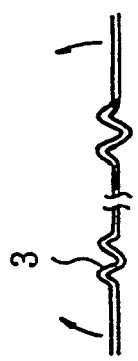
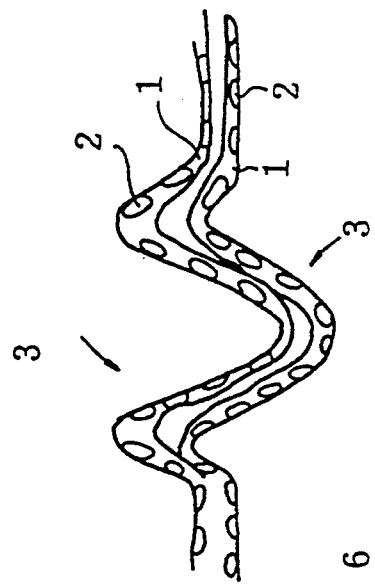
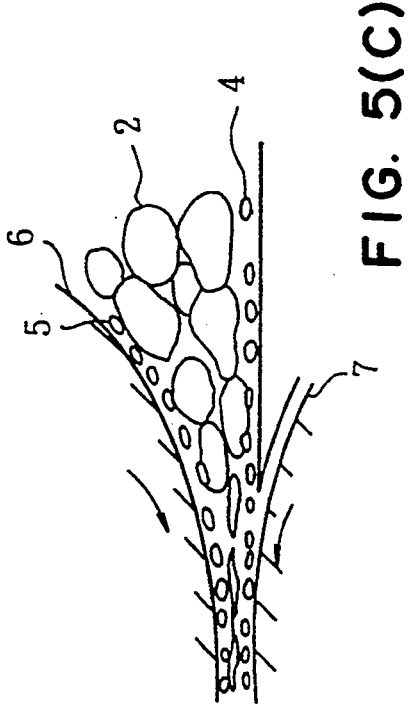
FIG. 5(A)
FIG. 5(B)
FIG. 5(C)

NOX REMOVAL CATALYST CONTAINING AN INORGANIC FIBER

FIELD OF THE INVENTION

The present invention relates to a NOx removal catalyst containing an inorganic fiber and a process for producing the same, more particularly to a NOx removal catalyst containing an inorganic fiber with a high strength to be used as a NOx removal catalyst for ammonia catalytic reduction.

PRIOR ART

NOx contained in flue gases from power stations, various factories and automobiles, etc. is a substance which causes photochemical smog and acid rain. As an effective NOx removal method, a method of removing NOx in flue gases by selective catalytic reduction using ammonia ($NH_3$) as a reducing agent is widely used, mainly in thermal power stations. As a catalyst, there is used a titanium oxide ($TiO_2$)-based catalyst containing vanadium (V), molybdenum (Mo) or tungsten (W) as an active component. In particular, a titanium oxide-based catalyst containing vanadium as one of the active components is a mainstream NOx removal catalyst nowadays, since not only does it have high activity but also it is less deteriorated by impurities contained in an exhaust gas and can be used even at a low temperature (Japanese Laid-Open Patent Publication No. 128681/1975, etc.).

The above catalysts are used in the above-desired exhaust gas treatment by being formed into a particulate, plate-like or honeycomb-like shape placed into a catalytic reactor. Methods of removing NOx by catalytic reduction using ammonia are used mainly for purifying exhaust gases from boilers for electricity generation, large-capacity boilers and gas turbines. The amount of a catalyst to be used is several hundreds to one thousand $m^3$ per plant and usually a catalyst is not changed for several years. It is necessary that a catalyst to be employed for such use be in a large form and have a high strength so that the wear and impairment of the catalyst do not occur for a long term.

Accordingly, many inventions have been made including a method of reinforcing a catalyst by adding an inorganic fiber into the catalyst in order to improve the strength of the catalyst (Japanese Laid-Open Patent Publication No. 65191/1977). Another method obtains a dense catalytic material by adding an organic or inorganic binder at the time of forming a catalyst (Japanese Laid-Open Patent Publication No. 122293/1977). Yet another method obtains a forming material with a high strength by sintering catalytic particles by calcination at a high temperature. Among the above, a method of adding an inorganic fiber is generally widely employed since it reduces the fragility of the sintering material and provides a large catalyst with a high strength.

In the above prior art, a method has been employed, which comprises kneading, as required, a binder component and water with a catalyst or a catalytic carrier component powder in advance to make a paste-like or clay-like substance and adding an inorganic fiber thereinto. Generally speaking, inorganic fibers such as a silica-alumina-based fiber and a non-alkali glass fiber are originally low in affinity with water.

In addition, since they are spun by using various mineral oils, the surface of fibers are coated with a very small amount of oil and their water repellency is thereby increased. When such an inorganic fiber 1 is mixed with a catalyst paste 2 as above, the inorganic fiber 1 repels the paste 2 and the inorganic fiber 1 alone becomes a large lump as shown in FIG. 4 (A) and is hard to mix with the paste 2. When an attempt to mix it with the paste 2 by further kneading, the lump of the inorganic fiber 1 is compressed to become more dense. At the same time it is cut and, as shown in FIG. 4 (B), it becomes dispersed in the paste 2 in a form of small, hard lumps. It is remarkably difficult to make the inorganic fiber 1 uniformly disperse in the paste 2 once the inorganic fiber 1 falls into such a state. Therefore, the prior art has had no choice but to use a catalyst paste in the state of FIG. 4 (B) in one degree or another.

The catalyst paste 2 containing a small lump of an inorganic fiber 1 shown in FIG. 4(B) is poor in paste properties and not suitable for a molding method such as extrusion molding and rolling molding usually employed for molding a catalyst. In addition, since the added inorganic fiber 1 is omnipresent, an improved effect in strength cannot be obtained as might be expected. Thus, said catalyst paste 2 has some problems.

In FIG. 5(A), (B), (C) is shown a plate-like product having a crimped portion 3 of a predetermined pitch, which is produced by putting a catalyst paste 2 made of a silica-alumina-based fiber mixed with a catalytic component according to the prior art between two inorganic fiber 1 woven cloths (ceramic screens) 4, 5, passing said paste 2 between a pair of pressing-coating rollers 6 7 at the upper and lower sides to coat the ceramic screens 4, 5 by pressing against said paste 2 and shaping it into a form. The crimped portion 3 forms upon peeling the upper and the lower screens 4, 5, and the rigidity of a catalytic material is remarkably reduced. Because of this, deflection of the catalytic material occurs, and the crimped portion 3 collapses and extends. The reason seems to be existence of a lump of an inorganic fiber 1 containing water (trade name: Kaowool (phonetic)) in the catalyst paste 2 and that water separates at the time of pressing and coating.

SUMMARY OF THE INVENTION

The object of the present invention is to provide a NOx catalyst containing an inorganic fiber and a process for producing the same in which the mixing of the inorganic fiber to mix is improved to obtain a catalyst paste suitable for various molding methods and that simultaneously improves strength due to the added inorganic fiber.

In order to accomplish the above-mentioned object, a first aspect of the present invention relates to a NOx removal catalyst containing an inorganic fiber obtained by kneading an inorganic fiber and water containing a surfactant to make a pulp-like substance, mixing said substance with a catalytic component to form a catalyst paste, shaping said catalyst paste into a predetermined form and then drying and calcining the resultant product.

A second aspect of the present invention relates to a process for producing a NOx removal catalyst containing an inorganic fiber, which comprises kneading the inorganic fiber with water containing a surfactant which changes the hydrophobic nature of the inorganic fiber to hydrophilic, adding a catalytic component thereto, further kneading the resultant mixture to make a clay-like or paste-like mixture of catalyst and the inorganic fiber and shaping the mixture.

A third aspect of the present invention relates to a NOx removal catalyst containing an inorganic fiber obtained by kneading an inorganic fiber and water containing a surfactant which changes the hydrophobic nature of the inorganic fiber to hydrophilic to make a pulp-like substance, adding a catalytic carrier substance thereto, further kneading the resultant mixture to make a paste-like mixture, then shaping, drying and calcining the mixture, and then adding a catalytically active component to the mixture to give the catalyst.

A fourth aspect of the present invention relates to a process for producing a NOx removal catalyst containing an inorganic fiber obtained by kneading an inorganic fiber and water containing a surfactant which changes the hydrophobic nature of the inorganic fiber to hydrophilic to make a pulp-like substance, adding a catalyst carrier thereto, further kneading the resultant mixture to make a paste-like mixture, then shaping, drying and calcining the mixture, and then adding a catalytically active component, carried on the shaped mixture, to give the catalyst.

In each embodiment of the present invention, it is preferable that the inorganic fiber is a silica-alumina-based fiber or a non-alkali glass fiber, and that the surfactant is methyl cellulose, alkyl sodium sulfonate or polyvinyl alcohol. However, neither the inorganic fiber nor the surfactant to be used in the present invention are restricted to the above-mentioned substances.

In FIG. 2 is shown a process for producing 2 kinds of catalysts of the present invention. When water containing a surfactant and an inorganic fiber are kneaded by a kneader in advance according to the present invention, the inorganic fiber becomes wet with water due to the effect of the surfactant and it is cut and dispersed in water to obtain a pulp-like water-inorganic fiber aggregate. When an oxide of a catalytic component is added thereto, the catalytic component particles suspend in the water containing the inorganic fiber as shown in FIG. 1(A). Because of this, as shown in FIG. 1(B), in an intermediate state before reaching the final paste the spaces between catalyst particles 11 are filled with aggregations 12 of inorganic fiber 1 containing catalyst paste 2 and are easily kneaded. Accordingly, the phenomenon as seen in the prior art wherein inorganic fiber 1 containing air is compressed into a hard lump and wherein the inorganic fiber 1 remains ununiform after kneading does not occur. When the kneading time is lengthened, the inorganic fiber 1 is dispersed easily and uniformly in the catalyst paste 2 as shown in FIG. 1(C), and an improvement in strength, which is the purpose of the addition of an inorganic fiber 1, is fully achieved.

In addition to the above-mentioned effect, the paste 2 with an inorganic fiber 1 dispersed uniformly therein is easily formed into a honeycomb-like form. Moldings with few defects or distortions can be obtained from said paste 2 and it is also easy to obtain moldings with a high strength from said paste.

Though the slight aggregation of an inorganic fiber 1 added to the paste 2 leads to defects such as the bend and cutting of moldings, particularly in honeycomb molding of small pitch cells of 3 to 5 mm, said defects can be greatly reduced by using the paste 2 with fibers 1 dispersed uniformly therein in accordance with the present invention.

According to the present invention, the mixing of the inorganic fiber 1 can be easily and uniformly carried out and the catalyst can exhibit improved strength due to the added inorganic fiber 1 and improved Young's modulus of elasticity.

Moreover, since the mixing of an inorganic fiber 1 becomes easy, the kneading time shortens. Thus, it is also reduces production cost.

Furthermore, a catalyst paste 2 with an inorganic fiber 1 dispersed uniformly therein can be easily obtained.

By employing the present process in honeycomb extrusion molding, wherein the aggregation of an inorganic fiber 1 tends to cause bending and cracking of moldings, moldings with few defects and a high strength can be obtained.

BRIEF DESCRIPTION OF THE DRAWINGS

FIG. 5C illustrates formation of a plate-like catalyst in accordance with the prior art and FIGS. 5A and 5B illustrate the product so formed.

DESCRIPTION OF THE PREFERRED EMBODIMENTS

Figures 1A, 1B:
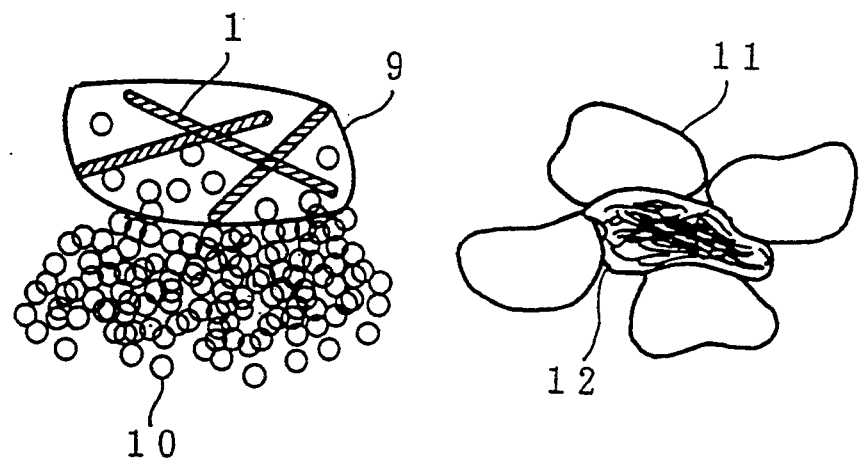
FIGS. 1(A), (B) and (C) are schematic views showing the behavior of an inorganic fiber in the process of producing a catalyst of the present invention.
Figure 1C:
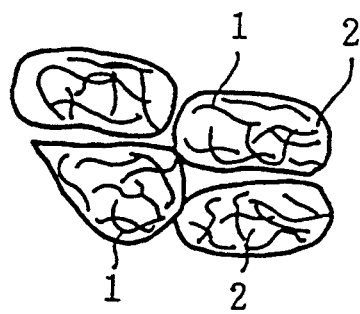
Figure 2A:
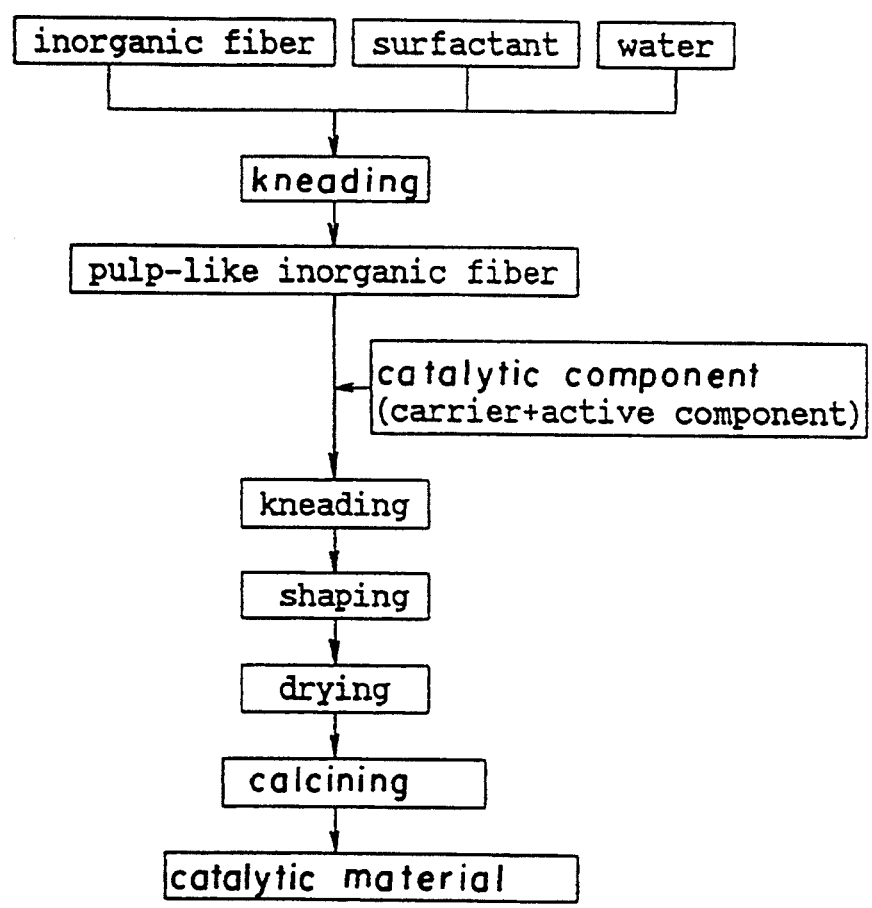
FIG. 2A and FIG. 2B show processes for producing two different catalysts in accordance with the present invention.
Figure 2B:
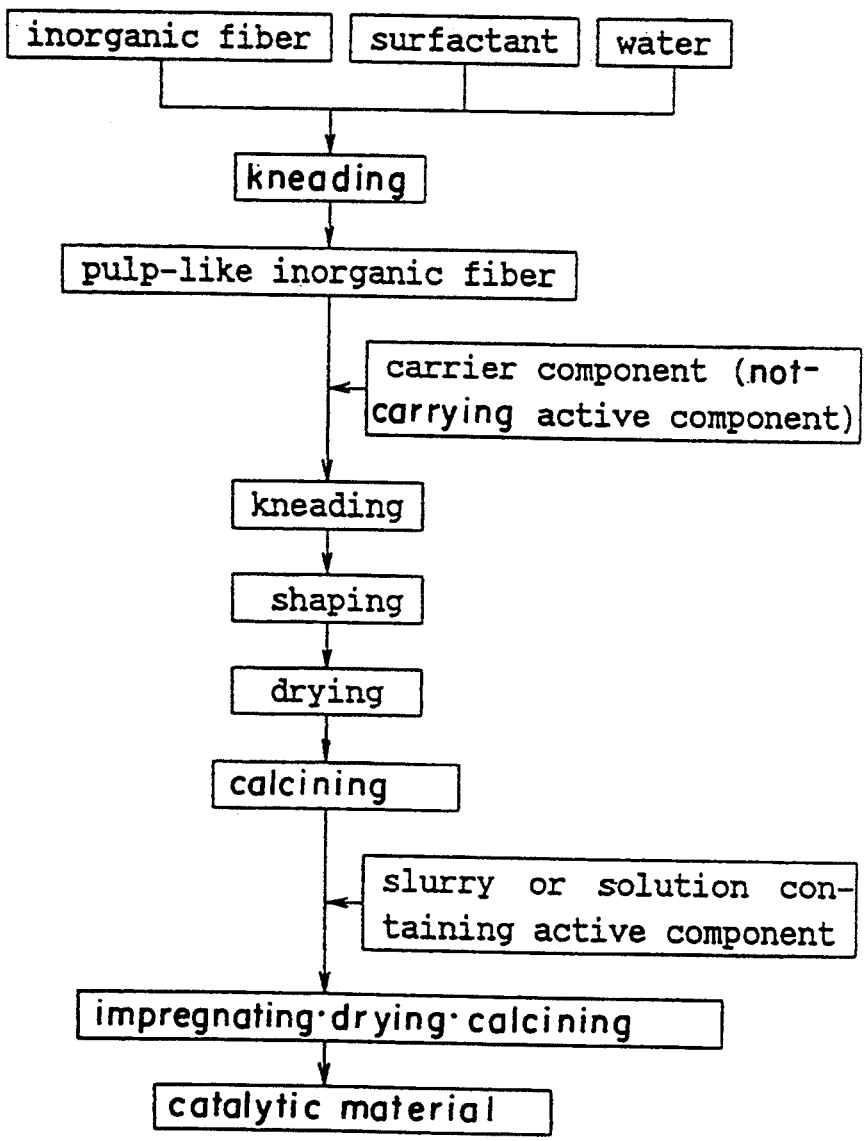

The present invention is a catalyst and a process for producing the same by kneading various kinds of inorganic fibers and water containing a surfactant or the like (hereinafter referred to as a surfactant) with a kneader to make a pulp-like substance, adding a catalytic component thereto and then further kneading the resultant mixture to prepare a catalyst paste. The thus obtained catalyst paste is shaped into a honeycomb-like, plate-like or column-like form according to conventional various molding methods, and then dried and calcined for use. Instead of the above catalytic components, catalytic carriers such as titanium, zeolite, zirconia and the like may be shaped and calcined in the same manner and used, carrying a catalytic component.

The surfactant to be used here to make an inorganic fiber hydrophilic are as mentioned above and the amount to be added is not particularly restricted. Usually, in order to impart hydrophilic nature to a fiber, it is used in an amount of exceeding 0 (not including 0) to about 5 weight %. When the amount is too small, the effect of removing the hydrophobic nature of an inorganic fiber is insufficient. When the amount is too large, the binding of catalytic particles is prevented and the catalytic strength is reduced.

For mixing an inorganic fiber and a surfactant, mixing and kneading machines such as a kneader and stirrer with a propeller are used. Since an inorganic fiber is easily ground, a kneader with high grindability such as a ball mill etc. is unsuitable. Besides, when a long inorganic fiber is used, it gives a good effect when it is cut to a certain length.

Regardless of the nature of the catalytic components, the effect of the present invention is exhibited. In the case of a NOx removal catalyst, a particularly high performance and strength can be obtained to give a good result when a composition produced by calcining a molybdenum (Mo), vanadium (V) or tungsten (W) compound supported on titanium oxide at 400° to 700° C. is used. For example, a catalytic component to be used is produced as follows: mixing a slurry or a power of titanium oxide, orthotitanate or metatitanate with water, an oxide of molybdenum, vanadium or tungsten, and a compound forming an oxide by thermal decomposition such as an oxo acid salt etc., evaporating water according to an ordinary method of producing a catalyst such as heating and kneading, evaporating to dryness, etc., drying the obtained paste and further calcining it at 400° to 700° C. for use as a catalyst. In order to knead the above pulp-like substance of an inorganic fiber, the above-mentioned kneader can be used and kneading is carried out till the water content of the paste becomes 20 to 40%.

In the case of the above NOx removal catalyst, the obtained catalyst paste is shaped into a honeycomb-like, column-like or cylindrical form by means of an extruder, or a plate-like form by coating a metal base such as a metal lathe etc., a ceramic or a glass net woven cloth by means of a roller. The shaped product is then cut into a required shape, formed, dried and calcined at a temperature in the range of 400° to 700° C.

The present invention will be further explained by the following examples.

Example 1

To 67 kg of a slurry of metatitanate (TiO$_2$ content: 30 weight %, SO$_4$ content: 8 weight %) was added 7.50 kg of ammonium paratungstate ((NH$_4$) 10H$_{10}$·W$_{12}$O$_{41}$·6-H$_2$O). The mixture was kneaded by a heat-kneader while evaporating water to obtain a paste containing about 36% water. The resultant paste was extruded into a column-like shape of 3 $\phi$, to make particles. The obtained particles were dried by a fluid-bed dryer and calcined at 550° C. for 2 hours. The obtained granules were pulverized by means of a hammer mill so that the granules with a diameter of 1 $\mu$m or less are 60% or more and a catalytic powder was obtained. The ratio of W/Ti was 1/9 (atomic ratio).

On the other hand, to 5.2 kg of a Al$_2$O$_3$·SiO$_2$-based inorganic fiber (trade name: Kaowool (phonetic), SiO$_2$/Al$_2$O$_3$ weight ratio: about 1) was added 30 g of a methyl cellulose-based surfactant (trade name: Metholose (phonetic)) dissolved in 9 kg of water. The mixture was kneaded by means of a kneader for 5 minutes to a pulp-like consistency. To the resultant product was added 20 kg of the above catalytic powder and the mixture was further kneaded for 30 minutes to obtain a catalyst paste containing 27% water.

Examples 2 and 3

The procedure as in Example 1 was repeated except that 6 g of sodium dodecyl sulfate and 10 g of polyvinyl alcohol were used instead of the methyl cellulose-based surfactant of Example 1 to obtain a catalyst paste.

Example 4

To 67 g of a slurry of metatitanate (TiO$_2$ content: 30 weight %, SO$_4$ content: 8 weight %) were added 2.5 kg of ammonium paramolybdate ((NH$_4$) 6Mo$_7$O$_{24}$·4H$_2$O) and 4.2 kg of ammonium metavanadate (NH$_4$VO$_3$). The mixture was kneaded by means of a heat-kneader while evaporating water to obtain a paste containing about 36% of water. The resultant paste was extruded into a column-like shape of 3 $\phi$ to make particles. The obtained particles were dried by a fluid-bed dryer and calcined at 550° C. for 2 hours. The obtained granules were pulverized by means of a hammer mill so that 60% or more of the granules had a diameter of 1 $\mu$m or less and a catalytic powder was obtained. The composition of V/Mo/Ti was 4.5/5/90.5 (atomic ratio).

A catalyst paste was obtained using this catalytic powder in the same manner as in Example 1.

Example 5

The same procedure as in Example 1 was repeated except that 5.2 kg of a filament wool of a non-alkali glass fiber (fiber diameter: 6 $\mu$m) was used instead of the inorganic fiber of Example 1 to prepare a catalyst paste.

Comparative Example 1

The same procedure as in Example 1 was repeated except that the surfactant of Example 1 was not used to prepare a catalyst paste.

Comparative Example 2

Instead of the kneading method of Example 1, 9 kg of water containing a surfactant was added to 20 kg of a catalytic powder. To the mixture was added 5.2 kg of a SiO$_2$·Al$_2$O$_3$-based inorganic fiber of Example 1 and kneaded by a kneader for 30 minutes to obtain a paste-like substance.

Comparative Example 3

The same procedure as in Example 4 was repeated except that the kneading method of Example 4 was replaced by that of Comparative Example 2 to prepare a catalyst paste.

Test Example 1

Figure 3:
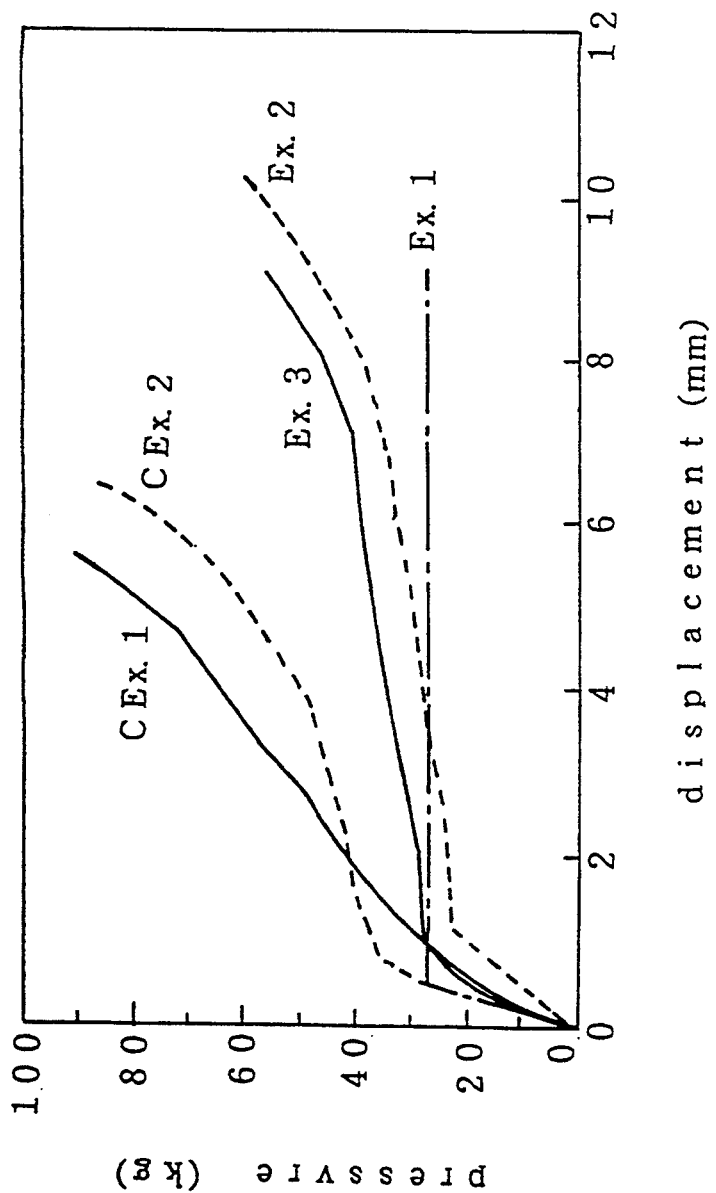
FIG. 3 shows the piston extrusion pressure and the displacement of paste obtained in Examples 1-3 and Comparative Examples 1 and 2.
Figure 4A:
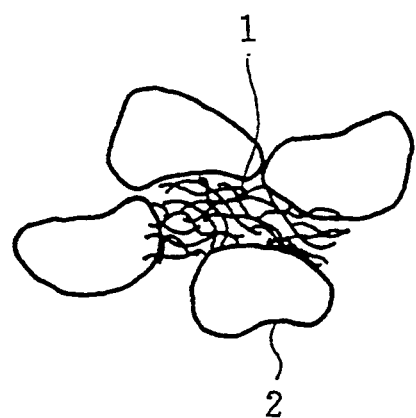
FIGS. 4A and 4B illustrate admixtures of inorganic fiber and catalyst obtained by mixing in accordance with the prior art.
Figure 4B:
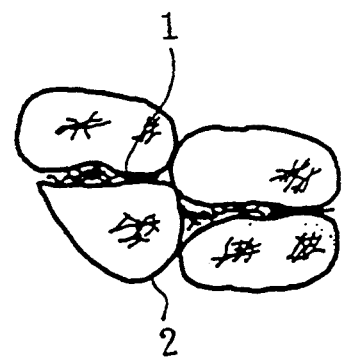

In order to evaluate the properties of the paste obtained in Examples 1–3 and Comparative Examples 1–2, an extrusion test was carried out using a piston extrusion molder with a cylinder diameter of 20 mm and a mouthpiece diameter of 3 mm, and extrusion pressure and the displacement of the piston were measured. The results are shown in FIG. 3. The results show that the catalyst paste of the present invention can be extruded under a low and specific pressure. It is shown in the pastes of Comparative Examples 1 and 2 that pressure increases according to small displacement and the pastes solidify at the portion of the mouthpiece or a lump of inorganic fiber contained in the paste gradually blocks the mouthpiece.

Thus, the process for producing the catalyst of the present invention is a suitable method for obtaining a paste suited for extrusion molding.

Test Example 2

A net-like substance base imparted with rigidity to be used as a base for the coating of a catalyst paste was obtained by impregnating an inorganic fiber woven cloth, which is produced by plain weaving a yarn composed of 1,400 filaments with a diameter of 9 $\mu$m of an E glass at 10 yarns per inch, with a slurry with a weight ratio of SiO$_2$/polyvinyl alcohol/TiO$_2$ of 10/2/50 and drying it at 150° C. Between two bases were put the catalyst pastes of Examples 1–5 and Comparative Examples 1–3, and a plate-like catalyst with a thickness of about 1 mm was obtained by contact bonding of a catalyst in the openings and at the surface of the bases by passing said pastes between a pair of squeeze rollers.

The obtained catalyst was dried at 180° C. for 2 hours and calcined at 550° C. for 2 hours.

The obtained plate-like catalyst was cut into a test sample with a length of 50 mm and a width of 20 mm, and strength and Young's modulus of elasticity were measured by means of an all-purpose bending tester. The results are shown in Table 1.

TABLE 1

| Catalyst paste used | Strength (kg/cm$^2$) | Young's modulus of elasticity (kg/mm$^2$) |
|---|---|---|
| Example 1 | 240 | 151 |
| Example 2 | 226 | 122 |
| Example 3 | 208 | 98 |
| Example 4 | 256 | 135 |
| Example 5 | 230 | 110 |
| Example 6 | 210 | 185 |
| Comp. Example 1 | 152 | 32 |
| Comp. Example 2 | 163 | 45 |
| Comp. Example 3 | 145 | 56 |

The above reveals that the catalysts using the pastes of the Examples of the present invention have a high strength, compared with those using the pastes of the Comparative Examples. In addition, Young's modulus of elasticity of the Examples of the present invention is almost three times that of the Comparative Examples.

Thus, according to the process of the present invention, it is possible to obtain a catalyst with a high strength and remarkably excellent elastic properties. The addition of an inorganic fiber aims at reducing the fragility of a metallic oxide molded product and the present invention exhibits a remarkable effect in this regard.

Example 6

The same procedure as in Example 1 was repeated except that a slurry of metatitanate was used instead of ammonium paratungstate to obtain a titanium-based catalytic carrier paste. A plate-like product with a thickness of about 1 mm was obtained by contact bonding of the paste on the bases in the same manner as in Test Example 2. The resultant product was dried, calcined, impregnated with a solution containing ammonium metavanadate and calcinated at 450° C. In the present Example, also, a catalyst with a high strength and high Young's modulus of elasticity was obtained. The results are shown in Table 1.

What is claimed is:

1. A process for producing a NOx removal catalyst containing an inorganic fiber, which comprises:

kneading water containing a surfactant and a hydrophobic inorganic fiber until the hydrophobic nature of the inorganic fiber is changed to hydrophilic, to disperse the fiber in a pulp-like admixture; and then adding a catalytic component to said pulp-like admixture and further kneading the resultant mixture to make a uniform dispersion of said fiber in a paste-like mixture and shaping the paste-like mixture to obtain a shaped catalytic material.

2. A process for producing the NOx removal, catalyst containing an inorganic fiber as set forth in claim 1, in which said inorganic fiber is a silica-alumina-based fiber or a non-alkali glass fiber, and said surfactant is methyl cellulose, alkyl sodium sulfonate or polyvinyl alcohol.

3. A process for producing a NOx removal catalyst containing an inorganic fiber, which comprises:

kneading water containing a surfactant and a hydrophobic inorganic fiber until the hydrophobic nature of the inorganic fiber is changed to hydrophilic, to disperse the fiber in a pulp-like admixture;

adding a catalytic carrier substance to said pulp-like admixture;

further kneading the resultant mixture to make an uniform dispersion of said fiber in a paste-like mixture;

then shaping the paste-like mixture to obtain a shaped catalytic material, drying and calcining the mixture; and then adding a catalytically active component to the mixture to obtain a shaped, supported catalyst.

4. A process for producing the NOx removal catalyst containing an inorganic fiber as set forth in claim 3, in which said inorganic fiber is a silica-alumina-based fiber or a non-alkali glass fiber, and said surfactant is methyl cellulose, alkyl sodium sulfonate or polyvinyl alcohol.

* * * * *